United States Patent
Stewart

(10) Patent No.: US 6,640,269 B1
(45) Date of Patent: *Oct. 28, 2003

(54) METHOD AND APPARATUS FOR ASSISTING COMMUNICATION OF INFORMATION BETWEEN TWO PROCESSES

(75) Inventor: Robert L Stewart, Wilton, NH (US)

(73) Assignee: Cisco Technology, Inc., San Jose, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/100,429

(22) Filed: Jun. 19, 1998

(51) Int. Cl.[7] .............................................. G06F 13/00
(52) U.S. Cl. ................................. 710/52; 710/4; 710/7; 710/20; 710/21; 710/33; 710/36; 710/53; 710/56
(58) Field of Search .............................. 710/1, 4, 7, 20, 710/21, 33, 36, 52, 53, 56

(56) References Cited

U.S. PATENT DOCUMENTS

| 4,855,994 A | 8/1989 | Takeuchi et al. |
| 4,953,123 A | 8/1990 | Takeuchi et al. |
| 5,062,073 A * | 10/1991 | Masuda et al. ............... 710/36 |
| 5,406,554 A * | 4/1995 | Parry .......................... 370/381 |
| 5,640,515 A * | 6/1997 | Park ............................. 710/52 |
| 5,673,415 A | 9/1997 | Nguyen et al. |
| 5,748,539 A | 5/1998 | Sproull et al. |
| 5,867,672 A * | 2/1999 | Wang et al. ................. 710/307 |
| 6,073,219 A | 6/2000 | Ohno |

* cited by examiner

Primary Examiner—Jeffrey Gaffin
Assistant Examiner—Mohammad O. Farooq
(74) Attorney, Agent, or Firm—Hickman Palermo Truong & Becker LLP

(57) ABSTRACT

A method and apparatus assists communication between a writer of a shared file and the reader of the shared file without requiring the use of a shared file. When the writer fills a buffer with information and provides a write commend to write the buffer to a shared file, the buffer is not written to a file. Instead, the pointer to the buffer is passed to the reader, and the writer may be suspended until the reader indicates it has read the file. Alternately, two buffers may be used, with the contents of the buffer used by the writer copied to a second buffer, allowing the writer to reuse the first buffer before the reader has completed reading the contents of the second buffer.

24 Claims, 7 Drawing Sheets

METHOD AND APPARATUS FOR ASSISTING COMMUNICATION OF INFORMATION BETWEEN TWO PROCESSES

FIELD OF THE INVENTION

The present invention is related to computer software and more specifically to computer software for intraprocess communication.

BACKGROUND OF THE INVENTION

Two computer processes can communicate using a shared file. If communication is in. one direction, one process known as a "writer" writes a file, and the other process, known as the "reader" reads the file. Conventional processes use an operating system to write and read the file. Each operating system may use a slightly different arrangement to write or read files.

To produce the shared file using some conventional operating systems, the writer sends an "open for write" command to the operating system, including a filename or other identifier with which to name the file. The operating system may create the file and open it. Additionally, the operating system may lock the file in response to such a command in order to prohibit use of the file by other processes while the file is being written. The writer may receive from some conventional operating systems a pointer or other identifier of the file in response to the open for write command.

Once the file is opened, the writer uses a buffer in memory to communicate to the operating system the information to be written to the file. The writer stores the information in the buffer, and sends a "write" command to the operating system. The identifier of the file received from the operating system and a pointer to the buffer may be included as part of the write command in order to identify the file and the buffer.

The buffer may be allocated in any of several ways. The writer may allocate as a buffer a portion of the memory allocated to the writer by the operating system and pass a pointer to the buffer with the write command. The operating system may allocate the buffer and pass a pointer to the buffer to the writer in response to the open for write command. The buffer may be allocated using other methods as well.

When the operating system receives the write command, the operating system copies the contents of the buffer to the file. The writer may repeat the "write" command after placing additional information into the buffer again and again, until the writer has finished writing the file. The writer then sends to the operating system a "close" command. The operating system then places an "EOF", or end-of-file marker, at the end of the file to alert any process that may read the file when the end of the file has been reached.

Once the file has been written, a similar process may be used to read the file. An "open for read" command containing the filename of the file to be read is sent to the operating system by the reader. The operating system allocates in memory a buffer which it will use to copy some or all of the file. When the reader sends the operating system a "read" command, the operating system copies some or all of the file into the buffer and returns to the reader a pointer to the buffer. The reader may use the pointer to retrieve the information copied into the buffer. The reader can repeat the read command again and again until it reads the end-of-file marker, at which point the reader closes the file by sending to the operating system a "close" command.

The use of a shared file requires the reader to wait until the entire file is written by the writer before the reader is able to read the contents of the file. This time can delay the start of processing of the information in the file by the reader. Additionally, if the amount of data in the file is large, significant storage resources may be required to store the file for such intraprocess communication. If these resources are not available, other communication methods must be employed.

One alternative communication method is to allow the two processes to communicate with one another directly. However, such communication may be more complex to implement than the use of the shared file approach described above. Additionally, if the two processes have already been designed for use with a shared file, rewriting the processes to facilitate direct communication may be highly complex.

Therefore, the system and method are needed to allow rapid communications to exist between processes designed for use with a shared file, without requiring the reader to wait until the writer completes writing a shared file, consuming significant system resources, or requiring significant alteration to the processes.

SUMMARY OF INVENTION

A method and apparatus intercepts from receipt by the operating system commands used to write and read shared files. When the writer fills a buffer and issues a write command, operation of the writer is suspended. Instead of writing the buffer to a file to be shared, the method and apparatus passes the data, for example by passing a pointer to the buffer, to the reader for immediate reading. When the reader completes reading the buffer, the writer is allowed to resume operation. The method and apparatus repeats the process until the writer issues a close command. At that point, an EOF indication is written into the buffer or otherwise passed to the reader. If desired, the method and apparatus can also suspend the writer when it sends the open for write command, until such time as the reader sends an open for read command, allowing the method and apparatus to more closely synchronize the operation of the two processes. Other embodiments of the method and apparatus utilize two or more buffers. The information is copied from the buffer used by the writer into a second buffer for use by the reader. This allows the suspension of the writer to end more quickly while still preventing subsequent operation of the writer from overwriting the information before the reader has had a chance to read it. A flag may be employed to indicate when the reader has started reading the second buffer. The flag may be used to additionally reduce the time the writer is suspended while ensuring that the buffer used by the writer is not copied into the second buffer before the reader has had a chance to read it.

Because the reader receives information from the writer as the writer writes it, the reader can begin processing the information received without waiting for the writer to send all of the information. Because less than all of the information produced by the writer may be stored at any given time, storage requirements may be significantly reduced when compared with the storage of the entire shared file. Because all of the commands sent between the writer and the method and apparatus are conventional commands that would have been used in shared file communications between the writer and the operating system, the writer requires no modification to operate with the method and apparatus of the present invention. Because all or nearly all of the commands sent between the reader and the method and apparatus are conventional commands that would have been used in shared file communications between the reader and the operating system, the reader requires no or little modification to operate with the method and apparatus of the present invention.

DETAILED DESCRIPTION OF A PREFERRED EMBODIMENT

Figure 1:
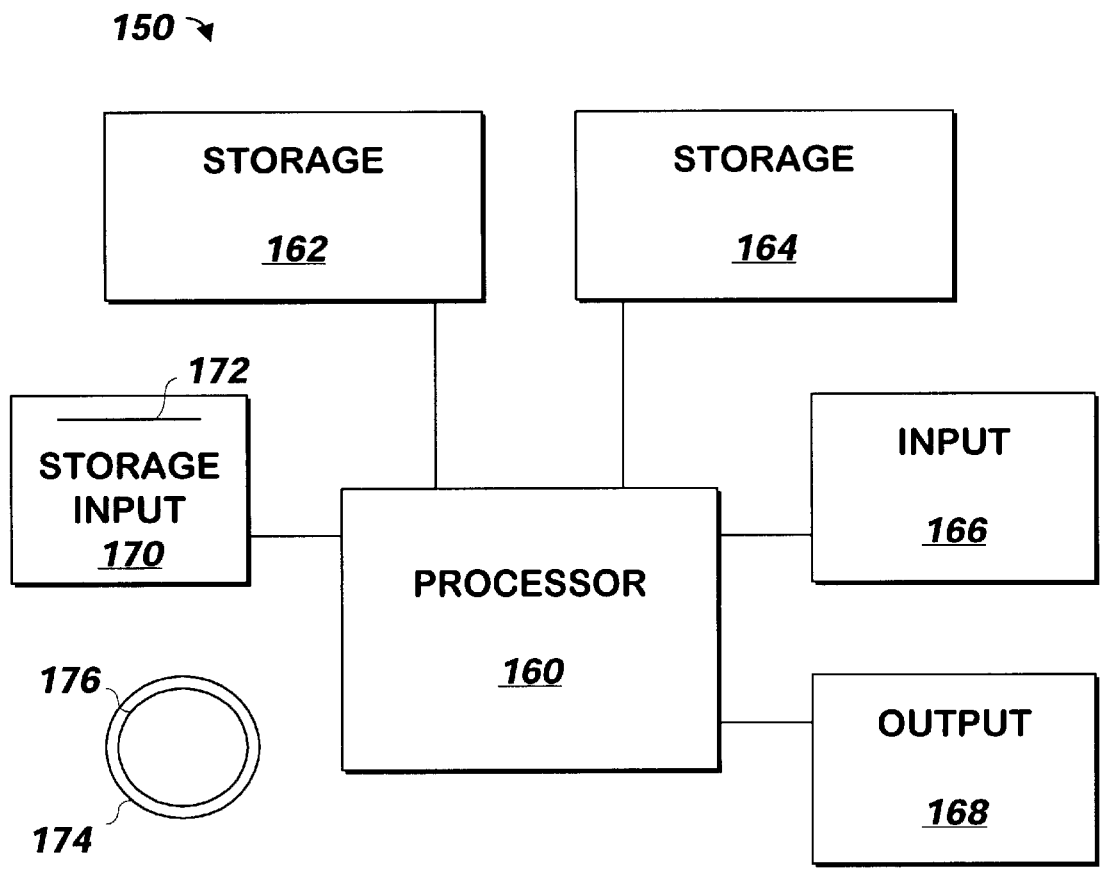
FIG. 1 is a block schematic diagram of a conventional computer system.

The present invention may be implemented as computer software on a conventional computer system. Referring now to FIG. 1, a conventional computer system 150 for practicing the present invention is shown. Processor 160 retrieves and executes software instructions stored in storage 162 such as memory, which may be Random Access Memory (RAM) and may control other components to perform the present invention. Storage 162 may be used to store program instructions or data or both. Storage 164, such as a computer disk drive or other nonvolatile storage, may provide storage of data or program instructions. In one embodiment, storage 164 provides longer term storage of instructions and data, with storage 162 providing storage for data or instructions that may only be required for a shorter time than that of storage 164. Input device 166 such as a computer keyboard or mouse or both allows user input to the system 150. Output 168, such as a display or printer, allows the system to provide information such as instructions, data or other information to the user of the system 150. Storage input device 170 such as a conventional floppy disk drive or CD-ROM drive accepts via input 172 computer program products 174 such as a conventional floppy disk or CD-ROM or other nonvolatile storage media that may be used to transport computer instructions or data to the system 150. Computer program product 174 has encoded thereon computer readable program code devices 176, such as magnetic charges in the case of a floppy disk or optical encodings in the case of a CD-ROM which are encoded as program instructions, data or both to configure the computer system 150 to operate as described below.

In one embodiment, each computer system 150 is a conventional Pentium II personal computer running the Windows 95 operating system commercially available from Microsoft Corporation, although other systems may be used.

Figure 2A:
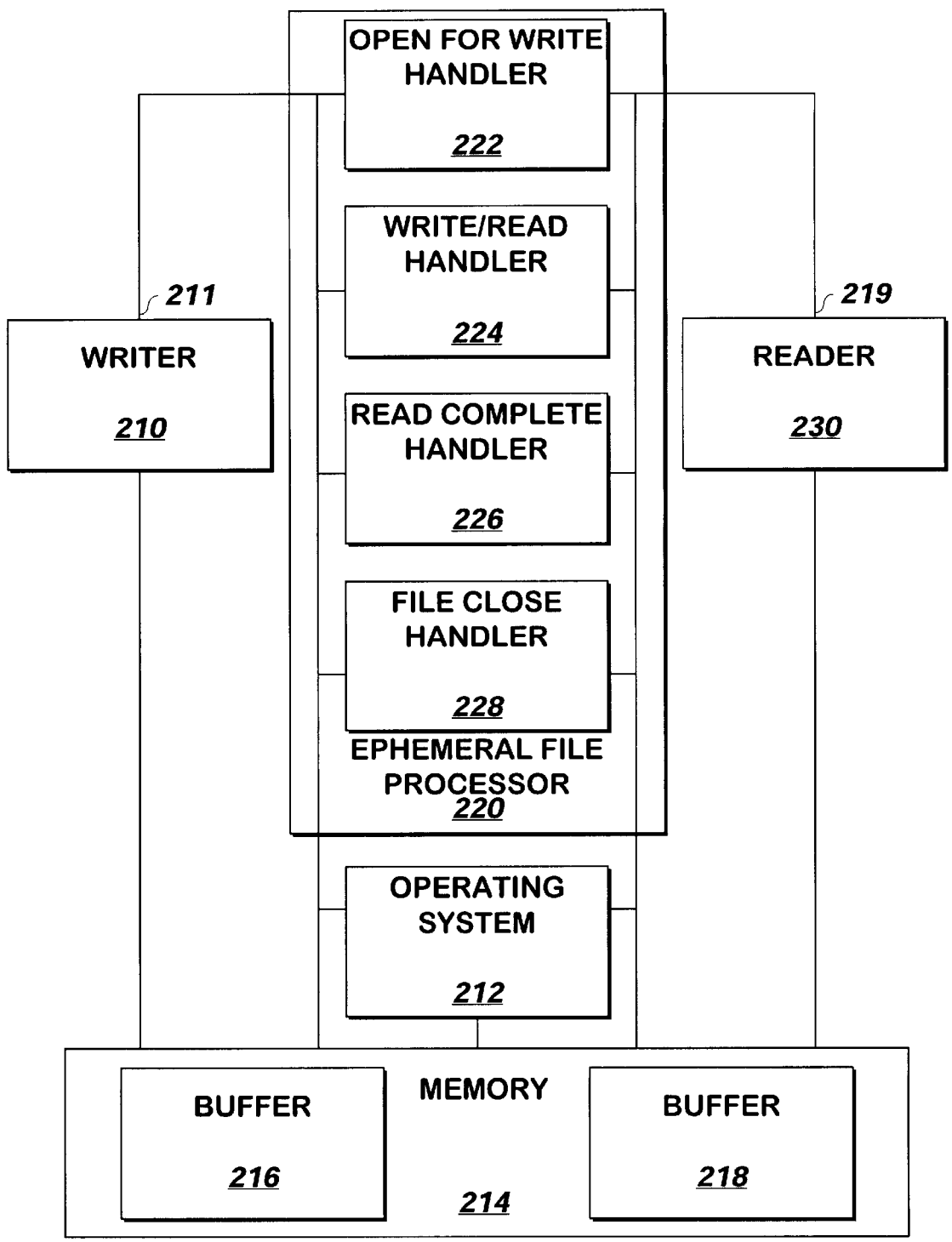
FIG. 2A is a block schematic diagram of an apparatus for assisting communication between a writer and a reader according to one embodiment of the present invention.

Referring now to FIG. 2A, an apparatus for assisting intraprocess communication is shown according to one embodiment of the present invention. In one embodiment, writer 210 communicates with reader 230 using ephemeral file processor 220. Ephemeral file processor 220 contains open for write handler 222, write/read handler 224, read complete handler 226, and file close handler 228, described in more detail below.

When the writer 210 is ready to write information, it sends a conventional "open for write" command. Open for write handler 222 receives the open for write command and in one embodiment, suspends the operation of writer 210. In one embodiment, open for write handler 222 is a subroutine called by writer 210. Open for write handler 222 suspends writer 210 by not returning control to writer 210 until the writer 210 is allowed to resume processing as described below.

The commands, such as the open for write command, provided by the writer and the reader are provided to ephemeral file processor 220. In one embodiment, writer and reader direct these commands to ephemeral file processor 220. In another embodiment, ephemeral file processor 220 intercepts these commands, which are actually intended for operating system 212. Ephemeral file processor 220 can intercept all operating system commands and pass on to operating system 212 only those commands that ephemeral file processor 220 does not process as described herein.

When the reader 230 is ready to read the information provided by writer 210, reader 230 sends to open for write handler 222 an "open for read" command. Next, open for write handler 222 allows writer 210 to resume processing.

In the embodiment described above, the writer 210 is suspended until the reader sends an open for read command. The effect is to cause the writer to wait to begin providing information until the reader is approximately ready to receive it, as evidenced by the open for read command. Selectively suspending operation of the writer 210 at the time of the open for write command can be useful when it is desirable to have the writer 210 performing write commands at approximately the same time as the reader performs read commands. Because the writer 210 will be again suspended while the reader is reading the information provided by the writer, in other embodiments, the open for write command does not suspend the writer.

Writer 210 places the data into buffer 216. Writer 210 uses a "write" command to indicate that the buffer is to be copied into the shared file having the name received in the open for write command. As described in more detail below, no such file is actually used for communication. Ephemeral file processor "fools" writer 210 and reader 230 into believing they are communicating using a shared file. In reality, by selectively suspending operation of the writer, the information in buffer 216 may be passed to reader 230. However, because the commands used are the same or similar to those used in a shared file arrangement, no modification of the writer is required for use with the present invention, and little or no modification of the reader is required. As described herein, information is passed from the writer 210 to the reader 230 by using a pointer to a buffer 216. However, the present invention may be used with other approaches for communication information, such as passing an object containing packets of the information or otherwise.

The buffer may be allocated by writer 210 using a portion of the memory allocated by operating system 212 to writer 210 when writer 210 starts running. In such embodiment, writer 210 is responsible for allocating the buffer and provides a pointer to the buffer with the write command.

In another embodiment, operating system 212 would have allocated the buffer if it had received the open for write command, and would have provided writer 210 with a pointer to the buffer in response to the open for write command. In such embodiment, open for write handler 222 allocates buffer 216 using memory allocated to ephemeral file processor 220. When open for write handler 222 allows the writer 210 to resume processing as described above, it provides a response to the open for write command with the pointer to buffer 216 it allocates. In such embodiment, the write command provided by writer 210 may or may not contain this pointer.

In still other embodiments, other arrangements of allocating the area in memory 214 as a buffer 216 and communicating the pointer may be employed by the present invention.

Figure 2B:
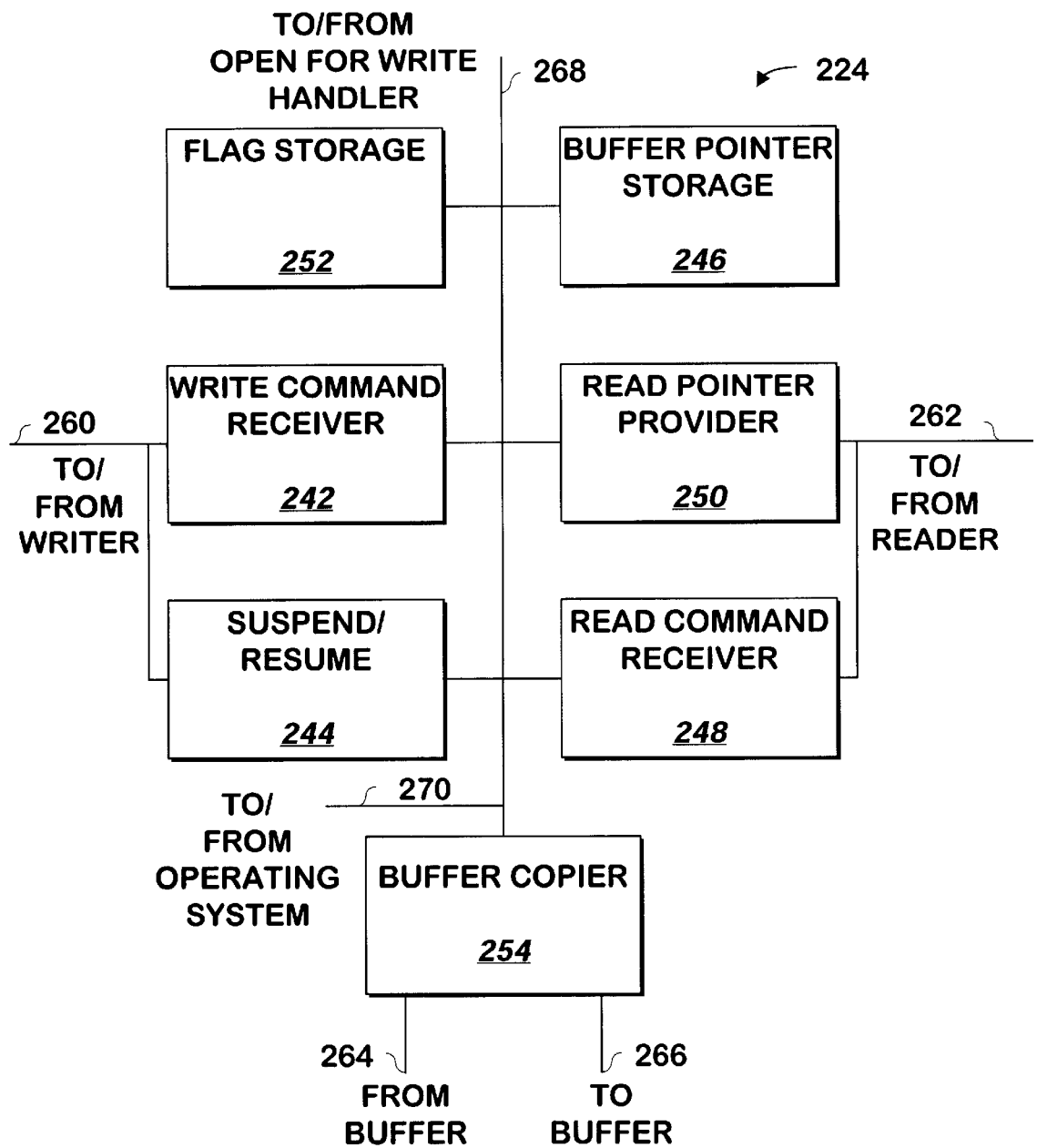
FIG. 2B is a block schematic diagram illustrating the write/read handler of FIG. 2A in more detail according to one embodiment of the present invention.

The write command provided by writer 210 is received by write/read handler 224. Write/read handler 224 is shown, in more detail in FIG. 2B. Referring now to FIGS. 2A and 2B. write command receiver 242 receives the write command at input/output 260. If the buffer pointer is part of the command, write command receiver 242 stores the buffer pointer in buffer pointer storage 246. If buffer 216 was allocated by ephemeral file processor 220 as described above, open for write handler 222 allocates buffer 216 and stores a pointer to buffer 216 in buffer pointer storage 246.

In one embodiment, write command receiver 242 signals suspend/resume 244 to suspend the operation of the writer 210 and suspend/resume 244 signals writer 210 to suspend processing. In another embodiment, suspend/resume 244 suspends writer 210 by simply not passing control back to writer 260 in response to receipt of the write command. In such embodiment, no signal is required to be passed to suspend/resume 244 in order to suspend writer 210 and suspend/resume 244 may be omitted.

When reader 230 is ready to read the data, reader 230 sends to write/read handler 224 a "read" command. Read command receiver 248 receives the read command at input/output 262 and signals read pointer provider 250. Read pointer provider 250 responds by retrieving and then providing to input/output 262 the pointer to buffer 216 stored in buffer pointer storage 246. Reader 230 uses the pointer it receives from write/read handler 224 to read the data in the buffer 216 as described above.

In one embodiment, it is possible that read command receiver 248 will receive a read command before write command receiver 242 has received a write command. Write command receiver 242 stores a flag, which write command receiver 242 sets upon receipt of a write command, and read command receiver 248 clears upon receipt of a read command. Read command receiver 248 checks this flag before signaling read pointer provider 250. If the flag is not set, read command receiver 248 waits a short period of time and then rechecks the flag, effectively suspending the reader. Read command receiver 248 repeats this process if the flag is not set until write command receiver 242 receives the write command.

When reader 230 has received the entire contents of buffer 216, reader 230 sends to read complete handler 226 a "read complete" command.

A read complete command is a command that is not used in a conventional shared file arrangements. Because the open for write, open for read, write and read commands are all the conventional commands that would have been sent to operating system 212 in order to communicate using a shared file, read complete represents the only change to the reader that is to be implemented in one embodiment of the present invention. Other embodiments of the present invention described below omit the use of a read complete command, and thus no changes are required to reader 230 or writer 210 in such other embodiments.

When read complete handler 226 receives this command, read complete handler allows writer 210 to resume processing, such processing having been suspended by write/read handler 224 as described above. In one embodiment, allowing writer 210 to resume processing is performed by transferring control to writer 210 as described above.

If writer 210 has additional data to communicate to reader 230, the write and read process described above is repeated until all of the data that would have been placed into a shared file has been sent to reader 230 in this fashion. Writer 210 then provides at output 211 a "close" command. File close handler 228 detects sending of the close command and provides to reader 230 a conventional "end of file" indication in response to the next read request, either directly of via the buffer to be read by the reader. Reader 230 may respond by providing at output 219 a conventional "close" command. The close command from reader 230 is received by file close handler 228 and used to allow ephemeral file processor 220 to, either directly or via operating system 212, clean up resources used for the communication. The intraprocess communication between writer 210 and reader 230 is complete.

In an alternate embodiment of the present invention, two buffers 216, 218 are used according to the present invention. In such embodiment, the operation of the present invention operates as described above, with the following exceptions. When open for write handler 222 receives the open command from writer 210, open for write handler 222 reserves a second buffer 218 for use as described below. The second buffer may be reserved by open for write handler 222 allocating buffer 218 from the memory allocated to ephemeral file processor 220 by operating system 212. Open for write handler 222 identifies a pointer to buffer 218, and passes this pointer to write/read handler 224. The location of the buffer may always be the same, and so the location of the buffer may be implied, in which case open for write handler 222 need not communicate it to write/read handler 224. When write command receiver 242 receives a write command from writer 210 as described above, write command receiver 242 suspends writer 210 and signals buffer copier 254. Buffer copier 254 copies buffer 216 at input 264 into buffer 218 at output 266 and signals suspend/resume 244. Suspend/resume 244 then allows writer 210 to resume processing.

Following a read command, instead of passing to reader 230 the pointer to buffer 216, the pointer to buffer 218 is passed by read pointer provider 250 to reader 230. Read complete handler 226 is not used in such embodiment, and reader 230 is not required to send a read complete command. Because the read complete command is not used to read conventional files, this alternate embodiment may allow use of the present invention without modification to reader 230.

In one embodiment, it is desirable to prevent buffer 218 from being overwritten from buffer 216 before reader 230 has had an opportunity to read the contents of buffer 218. In one embodiment, write command receiver 242 sets a timer in operating system 224 via input/output 270 when write/read handler 224 receives the write command, and suspends writer 210 as described above until the timer elapses. This embodiment is used if reader 230 will read the entire contents of buffer 218 shortly after the write command is received. The timer is set for a period which will provide adequate time for reader to read buffer 218.

In another embodiment, a flag is used to determine when it is safe to copy buffer 216 to buffer 218. The embodiment operates as described above using two buffers except as noted below. Write command receiver 242 sets a flag in flag storage 252 after buffer 216 is copied into buffer 218 as described above and signals suspend/resume 244 to allow writer 210 to resume processing. Read pointer provider 250 will clear this flag a short time after reader 230 sends a read command as described above as described in more detail below.

If the flag is set when writer 210 sends a subsequent write command, write command receiver 242 suspends processing of writer 210 as described above and write/read handler 224 waits to direct buffer copier 254 to copy buffer 216 into buffer 218 as described below.

When a read command is received from reader 230, read command receiver checks the flag in flag storage 252. If the flag is not set, read command receiver 248 periodically rechecks the flag in flag storage 252, and signals read pointer provider 250 to provide the pointer to the second buffer only after the flag is set. Read command receiver 248 uses the timer in operating system 212 described above or delays by looping or using similar techniques to wait an amount of time sufficient to allow buffer 218 to be read by reader 230. Then, read command receiver 248 clears the flag in flag storage 252 and signals write command receiver 242. Write command receiver 242 directs buffer copier 254 to copy buffer 216 into buffer 218, sets the flag in flag storage 252 and signals suspend/resume 244, which allows writer 210 to resume processing. This embodiment allows writer 210 to resume operation more quickly than the prior embodiment, but prevents copying the buffer if writer 210 writes more quickly than reader 230 is expected to read.

In another embodiment of the present invention, the apparati of FIGS. 2A and 2B operate differently to allow a single buffer to be used without a read complete handler 226. This allows the apparatus to facilitate communications with a minimum of storage requirements, and may not require modification of the reader 230 or writer 210.

Open for write handler 222 receives an open for write command from the writer 210 and suspends the writer 210 as described above. Open for write handler 222 waits until it receives an open for read command from reader 230 before allowing the writer to resume operation. Write/read handler 224 next receives a command from either reader 230 or writer 210.

Write/read handler 224 treats the first pair of commands it receives differently from the other commands it receives. The response to the first pair of commands depends on whether the first command is a read or a write. command. If the first command write/read handler 224 receives is a write command received from writer 210, write command receiver 242 receives the command. Write command receiver 242 signals suspend/resume 244 to suspend the writer 210. As described above, suspend/resume 244 may be omitted if write command receiver 242 simply does not transfer control back to writer 210 in order to suspend writer 210. Write command receiver 242 signals read command receiver 248, and passes the pointer received as part of the write command to read pointer provider 250. Read command receiver 248 waits until a read command is received from reader 230. Read command receiver 248 receives the read command, and signals read pointer provider 250. Read pointer provider 250 provides the pointer to reader 238 via input/output 262. Read pointer provider 250 signals read command receiver 248. Read command receiver 248 receives a subsequent read command from reader 230 via input/output 262 and signals suspend/resume 244 to suspend reader 230 and resume the writer 210. Suspend/resume 244 performs these functions, or such functions may be provided by read command receiver 248, read pointer provider 250, and write command receiver 242, which can transfer control back to writer 210 via input/output 260.

If the first command received by write/read handler 244 is a read command, the command is received by read command receiver 248. Read command receiver 248, either by not returning control to reader 230 or by signaling. suspend/resume 244 suspends reader 230. Additionally, in response to the read command received, read command receiver 248 signals write command receiver 242, which waits until a write command is received. When such command is received by write command receiver 242 via input/output 260, write command receiver 242 passes the pointer to the buffer 216 received as part of the write command to read pointer provider 250. Additionally in response to the write command received, write command receiver 242, either by not transferring control back to writer 210 or by signaling suspend/resume 244 suspends writer 210. Write command receiver 242 signals suspend/resume 244 and read pointer provider 250 to resume reader 230 if necessary, and provides the pointer received from write command receiver to reader 230. Read pointer provider 254 or write command receiver 242 signals read command receiver 248 to await the receipt of a read command. Upon receipt of the read command, read command receiver 248 signals suspend/resume 244 to suspend operation of the reader 230 if suspend/resume suspends reader 230 (otherwise, suspending reader 230 itself), and signals suspend/resume 244, or write command receiver 242 to allow writer 210 to resume operation.

Subsequent commands are received as described below. If suspend/resume 244 resumed operation of writer 210, suspend/resume 244 signals write command receiver. Write command receiver waits for a write command from writer 210. When such command is received by write command receiver 242 via input/output 260, write command receiver 242 passes the pointer to the buffer 216 received as part of their write command to read pointer provider 250. Additionally, write command receiver 242, either by not transferring control back to writer 210 or by signaling suspend/resume 244 suspends writer 210. Write command receiver 242 signals suspend/resume 244 and read pointer provider 250 to resume reader 230 if necessary, and provides the pointer received from write command receiver to read pointer provider 250. Read pointer provider 250 provides this pointer to reader 230. Read pointer provider 254 or write command receiver 242 signals read command receiver 248 to await the received of a read command. Upon receipt of the read command, read command receiver 248 signals suspend/resume 244 to suspend operation of the reader, if suspend/resume suspends reader 230, and signals suspend/resume 244, or write command receiver 242 to allow writer 210 to resume operation.

Writer 210 may send to file close handler 228 a "close" command at any time write command receiver 242 is waiting for a write command. Suspend/resume 244 stores the status of whether the reader 230 is in a state of suspension, and provides the status to file close handler 228 in response to a request from file close handler 228. If reader 230 is suspended, file close handler 228 inserts an EOF indication at the top of buffer 216 and signals suspend resume 244 if necessary to allow the reader to resume, and signals read pointer provider 250 to provide to reader 230 the pointer to buffer 216.

If reader 230 is not suspended, file close handler inserts the EOF indication and signals read command. receiver 248. When read command receiver 248 receives the next read command, read command receiver 248 instructs read pointer provider 250 to provide the pointer to buffer 216.

Read command receiver 248 receives the close command from reader 230, and signals file close handler 228 to clean up resources, for example, via operating system 212.

Figure 3A:
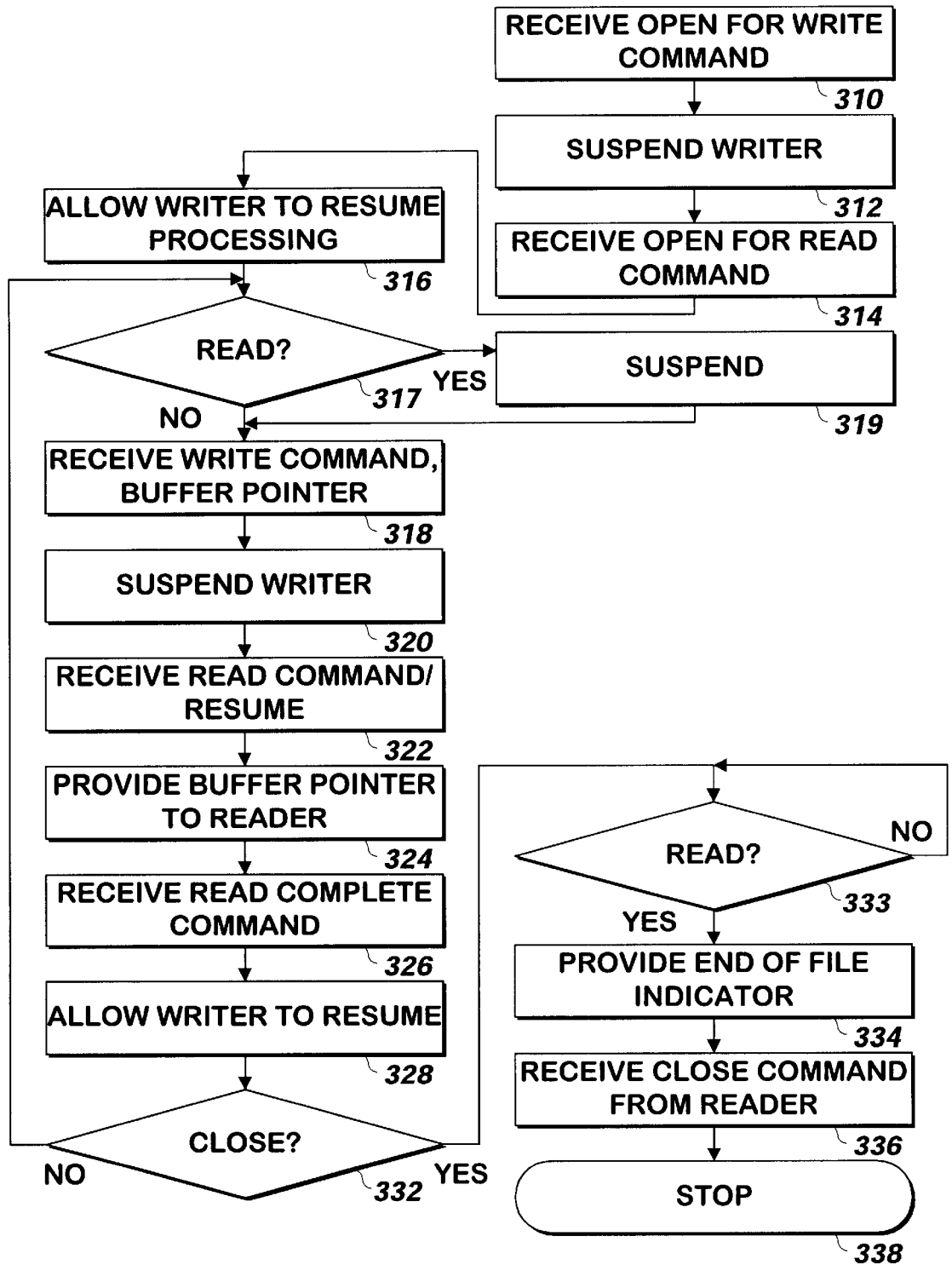
FIG. 3A is a flowchart illustrating a method of assisting communication between a writer and a reader according to one embodiment of the present invention.

Referring now to FIG. 3A, a method of assisting communication of information from a writer to a reader is shown according to one embodiment of the present invention. An "open for write" command is received 310. The writer is optionally suspended 312 as described above. An open for read command is received 314. After step 314, the writer is allowed to resume processing 316 if step 312 was performed.

In one embodiment, if the open for write command received in step 310 had been received by an operating system, the operating system would have provided a response including a pointer. In such embodiment, step 312 includes allocating a buffer and identifying a pointer to the buffer allocated, and step 316 includes providing a similar response to the writer including the pointer to the buffer identified.

A "write" command is received 318, and a buffer pointer, such as the buffer pointer provided in step 316, may also be received as part of, or in addition to, the write command received. The writer is suspended 320 as described above. When a "read" command is received 322, for example from a reader, the buffer pointer received either as a part of step 318, or step 312 is provided to the reader 324.

If a read command is received 317 before the write command is received 318, the reader is suspended 319 for example, by not returning control to the reader. Because the read command has already been received, it need not be performed again, and the reader is resumed as a part of step 322 in place of receiving the read command as described above.

In one embodiment, a "read complete" command is used. In such embodiment, a read complete command is received 326. Following the receipt of the read complete command in step 326, the writer is allowed to resume 328. An additional command is received 330 from the writer. If the command received in step 330 is a close command 332, the method continues at step 334, described in more detail below. If the command received in step 330 is not a close command 332, then the command received is an additional write command. In such event, the method continues at step 320.

If the command received in step 330 is a close command 332, an end of file mark is provided 334, for example to a reader. The end-of-file mark may be provided directly or placed in a buffer to be read by the reader. A "close"command may be received from the reader 336 and the method terminates 338

Figure 3B:
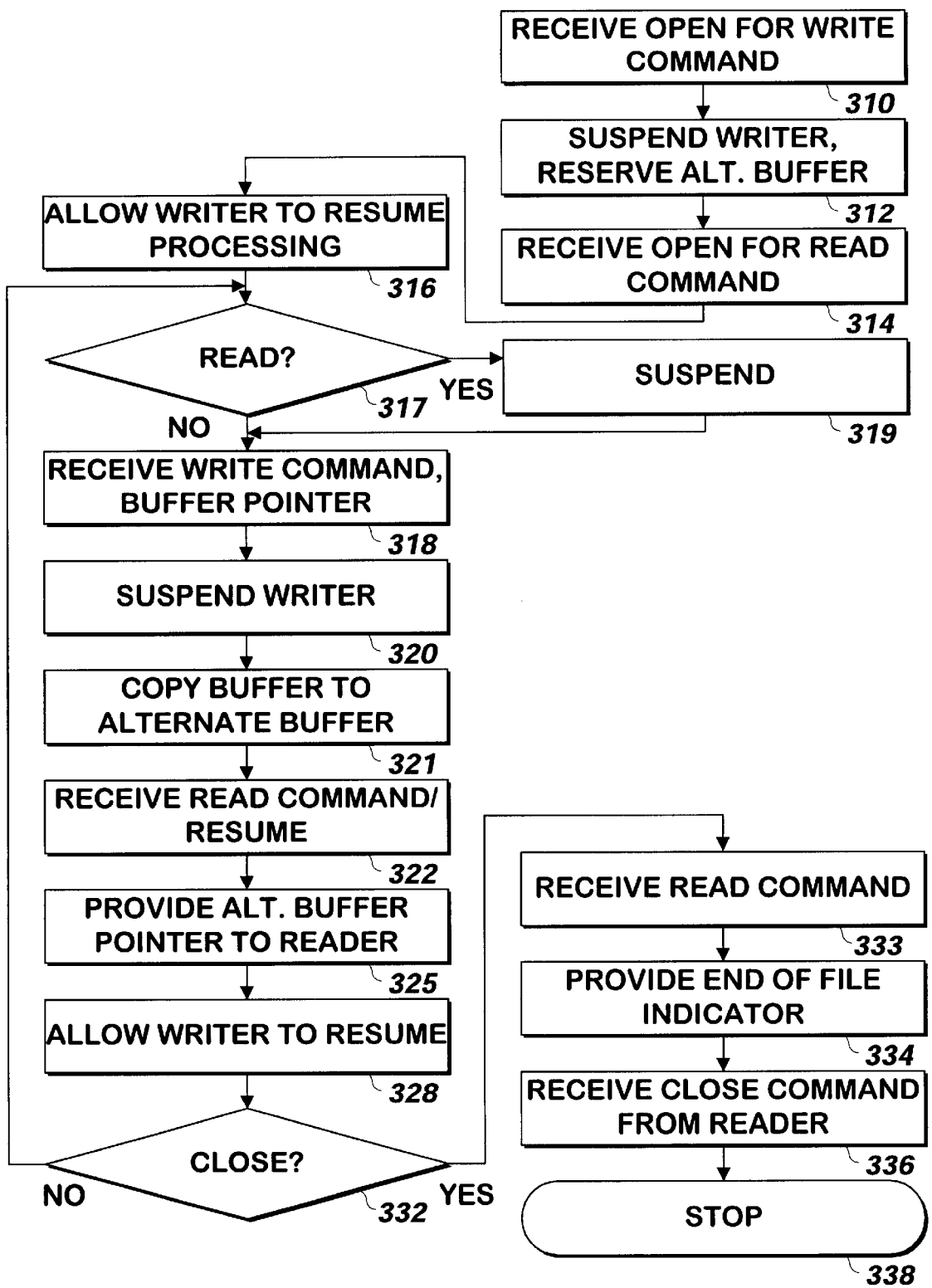
FIG. 3B is a flowchart illustrating a method of assisting communication between a writer and a reader according to an alternate embodiment of the present invention.

Referring now to FIG. 3B, a method of assisting communication of information from a writer to a reader is shown according to an alternate embodiment of the present invention. The method of FIG. 3B operates similarly to the method of FIG. 3A, except as noted below.

In one embodiment, step 312 includes reserving an additional buffer. The alternate buffer is a buffer different from the buffer written to by the writer.

After step 320 is performed, the buffer used by the writer is copied to the alternate buffer 321. After the read command is received in step 322, the pointer to the alternate buffer is provided to the reader 325. This alternate method shown in FIG. 3B allows step 326 of FIG. 3A to be omitted.

Figure 3C:
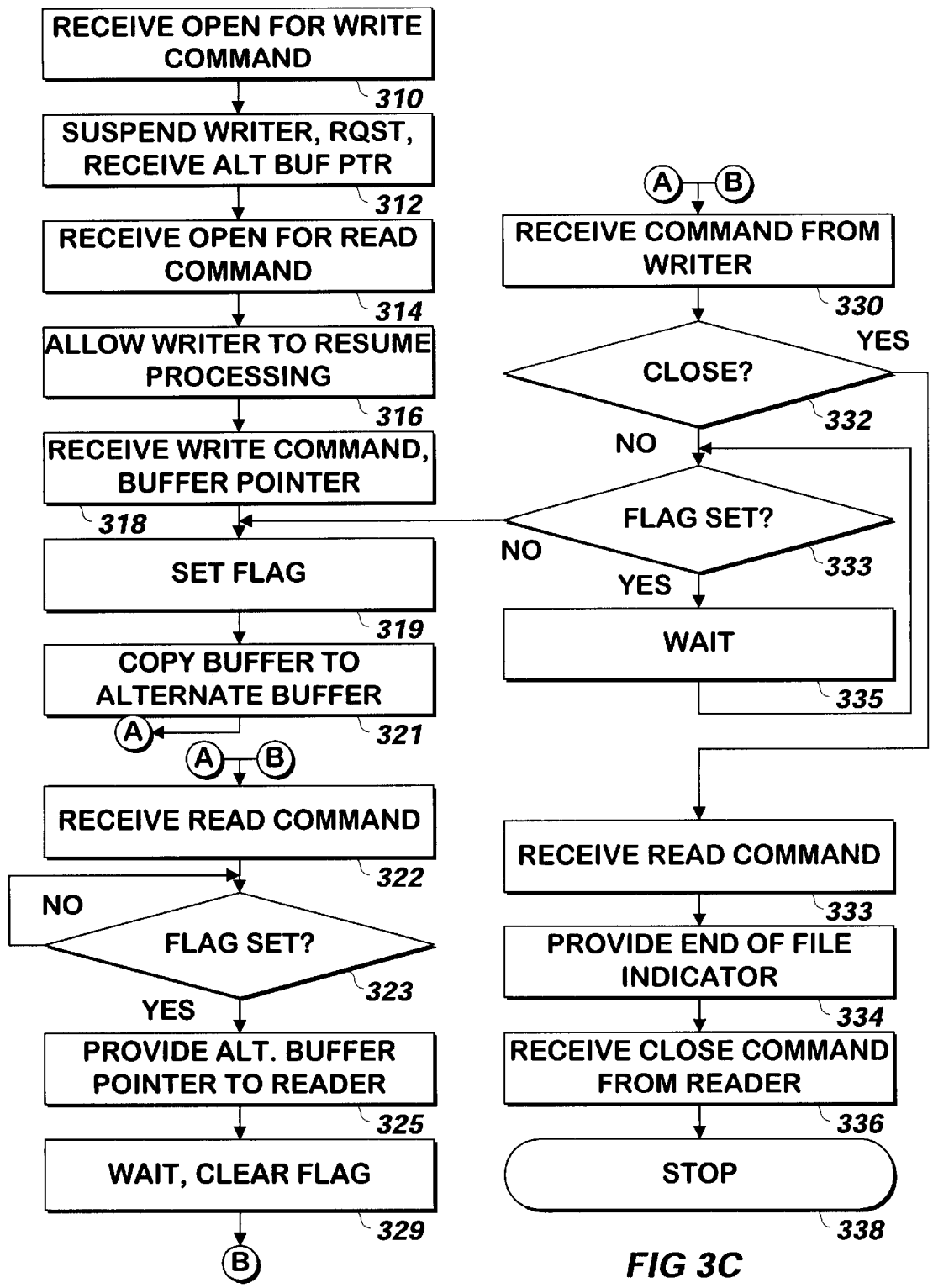
FIG. 3C is a flowchart illustrating a method of assisting communication between a writer and a reader according to an alternate embodiment of the present invention.

Referring now to FIG. 3C, a method of assisting communication of information from a writer to a reader is shown according to an alternate embodiment of the present invention. The method of FIG. 3C operates identically to the method of FIG. 3B, except as noted below. In FIG. 3C, the reader and writer may operate independently of each other and commands may be received from a reader or writer independently of the other. A flag is set 319 either before or after the buffer used for the write command is copied into the alternate buffer. When a read command is received 322, the flag is checked 323. If the flag is not set, the method waits until the flag is set before providing the alternate buffer pointer to the reader in step 325, suspending operation of the reader. Either immediately, or after waiting a short period after step 325 is performed, the flag is cleared 329. Processing may continue at step 322 described above or step 330.

When a command is received from the writer 330, if the command is a close command 332, steps 334 and 336 are performed as described above. Otherwise, if the flag is not set 333, the method continues at step 319. Otherwise, the method waits 335 until the flag is cleared by step 329. During the performance of step 335, the writer may be suspended from additional processing.

Figure 3D:
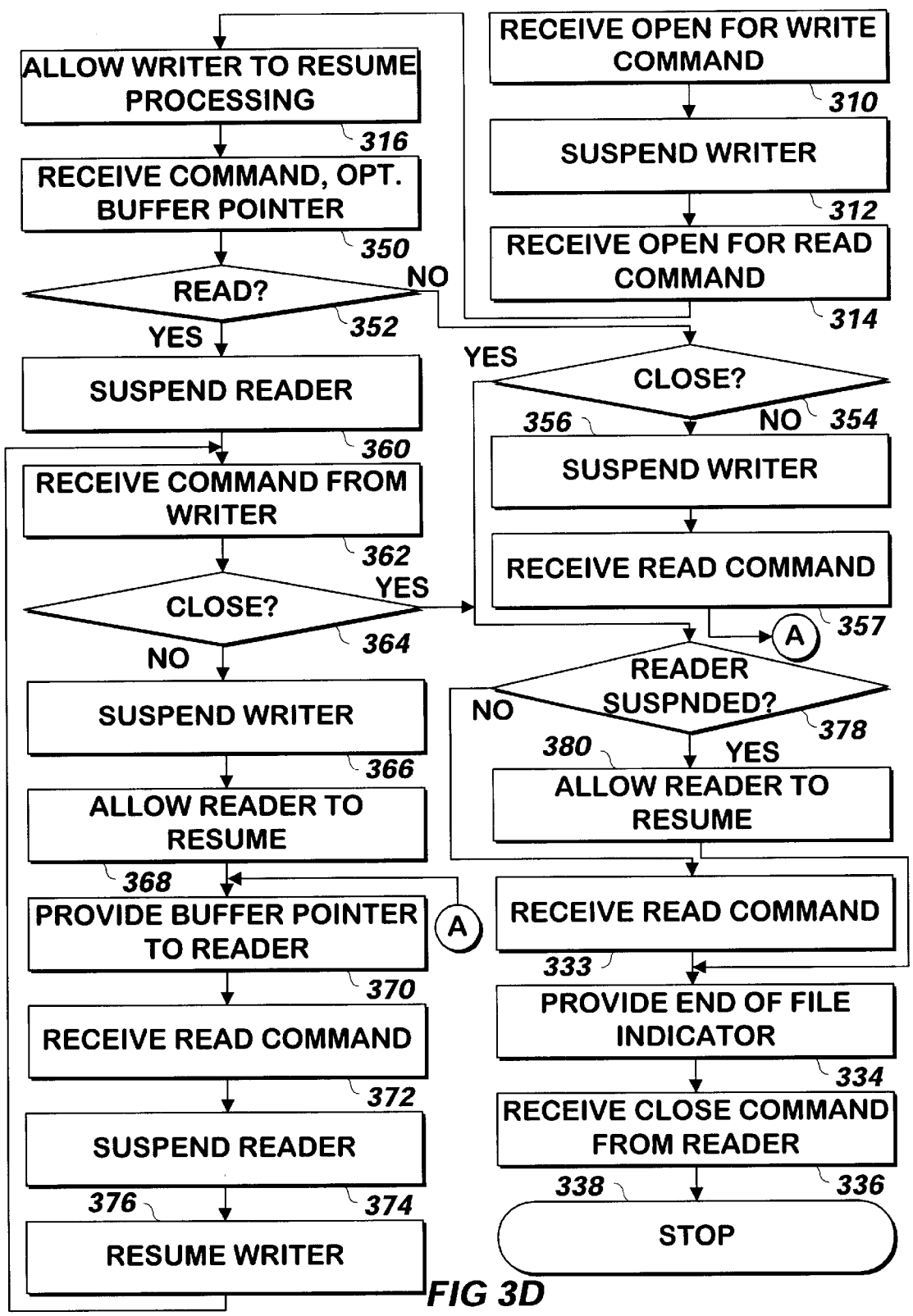
FIG. 3D is a flowchart illustrating a method of assisting communication between a writer and a reader according to an alternate embodiment of the present invention.

Referring now to FIG. 3D, a method of assisting communication between an writer and a reader is shown according to an alternate embodiment of the present invention. Steps 310–316 and 333–338 operate as described above with respect to FIG. 3A. A command is received 350. The command may be a read command, or another command such as write or close. If the command is a read command, the method continues at step 360, otherwise the method continues at step 354. If the command is a close command 354, the method continues at step 378, otherwise the method continues at step 356, each described in more detail below.

If the command is not a read nor a close command, the command is a write command. The writer is suspended 356. The method waits until a read command is received 367 and then the method continues at step 370, described in more detail below.

If the command received at step 350 was a read command 352, the reader is suspended 360. The method waits until a command from the writer is received 362 and then determines whether the command is a close command 364. If the command received from the writer in step 362 is a close command 364, the method continues at step 378 as described below. Otherwise, the command is a write command and the method continues at step 366.

If the command received in step 362 is a write command, the writer is suspended 366, and the reader is allowed to resume 368 as described above. The data in the buffer having the identifier received with the write command, either in step 368 or step 350, is passed to the reader 370, for example by providing to the reader a pointer to such buffer.

The method waits until a read command is received 372 and then suspends the reader 374 and allows the writer to resume 376. The method then continues at step 362.

If the command received in steps 362 or 350 is a close command, if the reader is suspended 378, it is allowed to resume 370. The method continues at step 334 as described above. If the reader is not suspended, the method waits for a read command 333 and the method continues at step 34 as described above.

What is claimed is:

1. A method of communicating information from a writer to a reader, the method comprising:
   a. receiving an identifier of a first buffer;
   b. receiving from a writer a command to write the information in the first buffer into a shared file that is shared by the writer and the reader;
   c. prior to writing any portion of the information responsive to the write command, suspending operation of the writer responsive to receipt of the write command and irrespective of the rate at which the information is written;
   d. receiving from the reader a command to read the shared file;
   e. providing to the reader an identifier of a second buffer; and
   f. allowing the writer to resume operation.

2. The method of claim 1 wherein the first buffer comprises at least a portion of the second buffer and step f follows at least one selected from steps d and e.

3. The method of claim 2, comprising the additional steps of:
   g. following step e, receiving from the reader a command indicating reading the second buffer is substantially complete; and
   wherein step f is responsive to step g.

4. The method of claim 3 comprising the additional steps of:
   h. receiving an additional command from the writer; and
   i. responsive to the additional command comprising a command to write the information in the buffer into a shared file that is shared by the writer and the reader, repeating at least steps c–f.

5. The method of claim 4 wherein step i additionally comprises repeating step a.

6. The method of claim 4, comprising the additional step of responsive to the additional command comprising a command indicating the shared file is to be closed, providing to the reader an end-of-file identifier.

7. The method of claim 1 comprising the additional step g of copying at least a portion of the information from the first buffer to the second buffer responsive to step b.

8. The method of claim 7, comprising the additional steps of:
   setting into a first state, a flag having the first state and a second state responsive to step b; and
   setting the flag into the second state responsive to at least one selected from step d and step g.

9. The method of claim 8, wherein step f is responsive to the flag in the first state and substantial completion of step g.

10. The method of claim 9 wherein step e is responsive to the flag in the first state.

11. The method of claim 1 wherein the information is not written to or read from the shared file.

12. A computer program product comprising a computer useable medium having computer readable program code embodied therein for communicating information from a writer to a reader, the computer program product comprising:
   a. computer readable program code devices configured to cause a computer to receive an identifier of a first buffer;
   b. computer readable program code devices configured to cause a computer to receive from a writer a command to write the information in the first buffer into a shared file that is shared by the writer and the reader;
   c. computer readable program code devices configured to cause a computer to, prior to writing any portion of the information responsive to the write command, suspend operation of the writer responsive to receipt of the write command and irrespective of the rate at which the information is written;
   d. computer readable program code devices configured to cause a computer to receive from the reader a command to read the shared file;
   e. computer readable program code devices configured to cause a computer to provide to the reader an identifier of a second buffer; and
   f. computer readable program code devices configured to cause a computer to allow the writer to resume operation.

13. The computer program product of claim 12 wherein the first buffer comprises at least a portion of the second buffer and the operation of computer readable program code devices f follow the operation of at least one selected from computer readable program code devices d and e.

14. The computer program product of claim 13, additionally comprising:
   g. computer readable program code devices configured to cause a computer to, following computer readable program code devices e, receive from the reader a command indicating reading the second buffer is substantially complete; and
   wherein computer readable program code devices f is responsive to computer readable program code devices g.

15. The computer program product of claim 14 additionally comprising:
   h. computer readable program code devices configured to cause a computer to receive an additional command from the writer; and
   i. computer readable program code devices configured to cause a computer to, responsive to the additional command comprising a command to write the information in the buffer into a file, repeat the operation of at least computer readable program code devices c–f.

16. The computer program product of claim 15 additionally comprising computer readable program code devices configured to cause a computer to repeat the operation of computer readable program code devices a.

17. The computer program product of claim 15, additionally comprising computer readable program code devices configured to cause a computer to, responsive to the additional command comprising a command indicating the shared file is to be closed, provide to the reader an end-of-file identifier.

18. The computer program product of claim 12 additionally comprising:
   g. computer readable program code devices configured to cause a computer to copy at least a portion of the information from the first buffer to the second buffer responsive to computer readable program code devices b.

19. The computer program product of claim 18, additionally comprising:
   computer readable program code devices configured to cause a computer to set into a first state, a flag having the first state and a second state responsive to computer readable program code devices b; and
   computer readable program code devices configured to cause a computer to set the flag into the second state responsive to at least one selected from computer readable program code devices d and computer readable program code devices g.

20. The computer program product of claim 19, wherein computer readable program code devices f is responsive to the flag in the first state and substantial completion of computer readable program code devices g.

21. The computer program product of claim 20 wherein computer readable program code devices e are responsive to the flag in the first state.

22. The computer program product of claim 12, wherein the information is not written to or read from the shared file.

23. An apparatus for communicating information from a writer to a reader, the apparatus comprising:

means for receiving an identifier of a first buffer; means for receiving from a writer a command to write the information in the first buffer into a shared file that is shared by the writer and the reader;

means for suspending operation of the writer, prior to writing any portion of the information responsive to the write command, responsive to receipt of the write command and irrespective of the rate at which the information is written;

means for receiving from the reader a command to read the shared file;

means for providing to the reader an identifier of a second buffer; and means for allowing the writer to resume operation.

24. The apparatus of claim 23, wherein the information is not written to or read from the shared file.

* * * * *

UNITED STATES PATENT AND TRADEMARK OFFICE
CERTIFICATE OF CORRECTION

PATENT NO. : 6,640,269 B1
DATED : October 28, 2003
INVENTOR(S) : Stewart

It is certified that error appears in the above-identified patent and that said Letters Patent is hereby corrected as shown below:

<u>Column 12,</u>
Line 41, "into a file, repeat the operation of at least" should read -- into a shared file that is shared by the writer and the reader, repeat the operation of at least --.

Signed and Sealed this

Ninth Day of March, 2004

JON W. DUDAS
*Acting Director of the United States Patent and Trademark Office*